United States Patent [19]

Taub

[11] 4,435,798
[45] Mar. 6, 1984

[54] METHOD AND APPARATUS FOR CLEANING DISKS CONTAINING ENCODED INFORMATION

[76] Inventor: Stanley Taub, 465 W. Broadway, New York, N.Y. 10012

[21] Appl. No.: 361,140

[22] Filed: Mar. 24, 1982

[51] Int. Cl.³ .......................... G11B 3/58; A47L 13/40
[52] U.S. Cl. ...................................... 369/72; 361/225; 361/230
[58] Field of Search ..................... 369/72, 73; 361/233, 361/234, 225, 230

[56] References Cited

U.S. PATENT DOCUMENTS

| | | | |
|---|---|---|---|
| 1,292,349 | 1/1919 | May | 369/72 |
| 2,149,556 | 3/1939 | Smith | |
| 2,958,529 | 11/1960 | King | 369/74 |
| 2,977,127 | 3/1961 | Mertes | 369/72 |
| 3,150,401 | 9/1964 | Taylor et al. | 15/311 |
| 3,185,485 | 5/1965 | Brubakvi | 369/74 |
| 3,618,958 | 11/1971 | Schmidlin | 369/74 |
| 3,822,065 | 7/1974 | Arbib | 369/74 |
| 3,945,647 | 3/1976 | Rangabe | 369/72 |
| 3,958,292 | 5/1976 | Powell | 15/104 |
| 3,965,520 | 6/1976 | Maier | 369/72 |
| 3,992,018 | 11/1976 | Plummer et al. | 369/72 |
| 4,198,061 | 4/1980 | Dunn | 369/73 |

OTHER PUBLICATIONS

Audio News, *Product Review of the Colton Electroduster*, Jun. 1976.

*Primary Examiner*—Steven L. Stephan
*Attorney, Agent, or Firm*—Senniger, Powers, Leavitt and Roedel

[57] ABSTRACT

An electrostatically activatable strip of mechanically chargeable, resilient, flexible material capable of retaining for at least twenty-five minutes, an electrostatic voltage sufficient to remove dust particles from the surface of a disk to be cleaned, the strip being softer than the disk to be cleaned. The strip is charged either by brushing or by separating it from a pressure sensitive adhesive surface. The strip is then passed over the disk to be cleaned, either manually or by mounting the strip radially across the disk and rotating the disk with respect thereto. Particularly favorable materials for the strip are silicone rubbers and latex rubbers having a Shore A durometer hardness of less than 100.

22 Claims, 6 Drawing Figures

METHOD AND APPARATUS FOR CLEANING DISKS CONTAINING ENCODED INFORMATION

BACKGROUND OF THE INVENTION

This invention relates to the cleaning of disks containing encoded information, such as phonorecords and videodiscs, and more particularly to electrostatically cleaning such disks with an electrostatically activatable flexible strip.

Dust particles (i.e., foreign matter) on the surface of a phonorecord can interfere with the fidelity with which the sound, i.e., the information encoded on the phonorecord, is reproduced when the phonorecord is played. The annoying and disruptive transients, popping and crackling resulting from the dust particles are well known. Substantially the same problem occurs with dust particles on videodiscs, namely the pictures and the sound may be distorted during playback because of the presence of dust particles.

Various systems to deal with the problems of cleaning dust particles off phonorecords have been proposed. Among them are those systems shown in the following U.S. Pat. Nos.: 2,958,529 to King; 2,977,127 to Mertes; 3,150,401 to Taylor et al.; 3,185,485 to Brubaker; 3,618,958 to Schmidlin; 3,822,065 to Arbib; 3,958,292 to Powell; 3,965,520 to Maier; and 3,992,018 to Plummer et al.

The patent to King discloses an attachment A for a phonograph pick-up arm for removing grit and dust from the grooves of phonorecords as well as for eliminating static electricity created by the needle rubbing along the record. The attachment includes a plastic or foam rubber sponge 36 disposed adjacent the phonograph needle, labelled 16, which purportedly (see col. 3, 11. 12-20) eliminates static electricity imparted by the moving needle to the dirt on the record. Sponge 36 rests on the record which it is cleaning and takes the shape of the grooves and ridges of the record at its lower surface to clean the entire surface, presumably mechanically.

The patent to Mertes shows a device for cleaning phonorecords having two arms 1 and 2 covered with a pad 6 of resilient synthetic resin foam (preferably polyurethane foam). According to the patent, the foam pad "wipes out" electrostatic charges on the phonorecord being cleaned. Preferably (see col. 1, 11. 62-66) pad 6 is impregnated with a liquid to increase the cleaning effect. Although the device of this patent is intended to be used as shown in FIG. 2, it can also be opened completely so that arm 1 lies substantially in the extension of arm 2 and arm 2 can then be placed over the spindle of the turntable to span the record.

The Taylor et al. patent describes a phonorecord cleaner 10 having a pair of brushes 36 for physically dislodging dust from the surface of the record. Cleaner 10 also includes opposed strips 66 of polonium impregnated material for radioactively neutralizing static electricity on the record to be cleaned. The Brubaker patent discloses a tone arm mounted dust remover for phonorecords having nylon brush assembly bristles 33 for physically ejecting dust from the grooves of the record to be cleaned and a fluid moistened plush pad 37 for collecting the dust ejected by bristles 33 and for removing any electrostatic charge from the record. The Schmidlin patent shows a tone arm attachment for a phonorecord which includes a felt mat for wiping dust from the phonorecord during play without scratching the surface of the record.

The patent to Arbib is very similar to the Brubaker patent in that both disclose tone arm mounted attachments with a brush and a plush pad. In the Arbib patent either the brush (14) or the pad (23) can be moistened with water or a special anti-static or cleaning fluid if desired.

The Powell patent describes a roller covered with adhesive tape for cleaning phonorecords, the bond strength between the adhesive particles exceeding that between the adhesive particles and the record face so that adhesive particles do not separate from the tape and become attached to the record. To clean a record, the roller with fresh adhesive tape exposed is rolled across the surface to be cleaned before the phonorecord is played. The patent to Maier shows a similar, non-real time (i.e., not during playback) cleaning system except that in the case of the Maier patent the cleaning device is not an adhesive coated roller but rather is a special brush dampened with an anti-microbial liquid cleaning composition.

The Plummer et al. patent describes a cleaning system for phonorecords having a plush cleaning element 6 mounted on a lid 11 of the phonorecord player. When the lid is closed element 6 rests on the phonorecord along the dotted line 5. Alternatively (see col. 2, 11. 26-39) the cleaning element can be mounted on a cantilevered arm extending across the phonorecord, the arm being counterbalanced to enable the cleaning element to rest on the record with the proper pressure.

Applicant is also aware of another phonorecord cleaning apparatus sold by Musonic Ltd. of St. Albans, England under the trade designation Colton Electroduster. This apparatus includes an arm, supported by a pillar at the edge of the turntable, which terminates in a rubber rimmed wheel resting upon the label of a phonorecord to be cleaned. According to a review article on the apparatus, the wheel rotates as the record is played to cause an electrostatic belt of soft fibers to traverse the record surface radially. According to the article, the belt is charged during play of the record by passage over a cleaning pad, which pad also collects any loose debris attracted by the belt. Simultaneously, a velvet tracking pad laterally traverses the disk before the stylus to clean the grooves of the phonorecord while the record is being played.

Also of interest to this application are devices such as that shown in U.S. Pat. No. 2,149,556 to Smith for electrostatically cleaning furniture and other fabrics.

The devices and systems mentioned individually suffer from several disadvantages, among them being undue complexity, the need for or desirability of a cleaning or antistatic fluid, interference with the playback of the phonorecord caused by mechanical contact between a portion of the system and the surface of the record during playback, an inability to provide real-time (i.e., during playback) cleaning of the phonorecord, and expense of the systems themselves.

SUMMARY OF THE INVENTION

Among the several objects of the present invention may be noted the provision of a system for cleaning disks such as phonorecords and videodiscs which is mechanically simple and has few moving parts; the provision of such a system which cleans the surfaces of phonorecords and videodiscs without the use of cleaning or anti-static fluids; the provision of such a system which provides real-time protection and cleaning of the phonorecord or videodisc without mechanical contact between the system and the disk; and such a system which is inexpensive and simple in construction. Other objects and features will be in part apparent and in part pointed out hereinafter.

Briefly, the method of the present invention includes the step of mechanically charging in a charging area an electrostatically activatable elongate strip of soft flexible material to a voltage sufficient to remove dust particles from the surface of a disk to be cleaned, the voltage being substantially uniform along the longitudinal axis of the strip. The strip is capable of retaining a voltage of this level at least long enough to permit passing it over one entire side of the disk before recharging. The strip, after charging, is moved from the charging area to the surface of the disk to be cleaned and is passed over at least a portion of the surface to remove dust particles therefrom.

The apparatus of the present invention includes an electrostatically activatable elongate strip of mechanically chargeable, soft flexible material capable of retaining an electrostatic voltage sufficient to remove dust particles from the surface of a disk to be cleaned at least as long as the time required to play one entire side of the disk before recharging, the electrostatic voltage being substantially uniform along the longitudinal axis of the strip. Also provided is means for mounting the strip to span at least a portion of one side of the disk while the disk is rotated with respect thereto by a player to effect relative movement between the disk and the strip without influencing the rotational characteristics of the disk and the playback characteristics of the player. Dust particles on the disk in the vicinity of the strip as the disk is rotated with respect thereto are attracted to and captured by the strip as a result of the electrostatic voltage on the strip.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
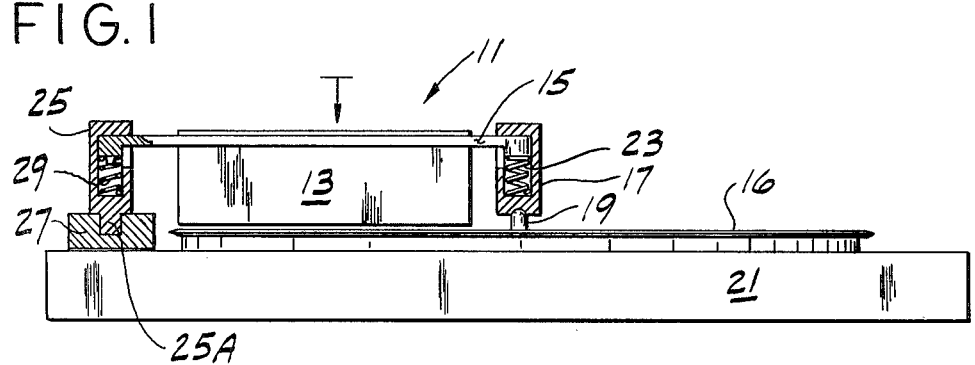
FIG. 1 is an elevation, with parts broken away, showing a first embodiment of a disk cleaning system of this invention.

Referring now to the drawings, a disk cleaning system 11 (see FIG. 1) of the present invention includes an electrostatically activatable elongate strip 13 of soft, flexible, resilient material mounted on an arm 15 to radially span a portion of a disk 16 to be cleansed, said arm constituting means for mounting said strip. In the figure, the disk to be cleaned is shown as a phonorecord, but it is to be understood that this is illustrative only. At one end, arm 15 terminates inside a hollow, cylindric support 17, the bottom of which support rests on the spindle 19 of a phonorecord player 21. A spring 23 disposed inside support 17 biases arm 15 and strip 13 to the position shown in FIG. 1 in which strip 13 is suspended above the surface of phonorecord 16. The other end of arm 15 terminates inside a hollow, cylindric support post 25 having a pin 25A which sits during use in a corresponding socket in a base 27. Inasmuch as post 25 and support 17 are detachable from the phonorecord player, strip 13 and arm 15 may be easily lifted from the player for cleaning and charging. Suitable means for adjusting the spacing between the bottom of the strip and the discs may also be provided to compensate for variations from disk to disk. A spring 29 inside post 25 serves the same function as spring 23 in support 17. As will become apparent, strip 13 is shown in FIG. 1 in the position in which it performs real-time (i.e., during playback) cleaning of the phonorecord. Strip 13, as can be seen from FIG. 1 extends generally from the inner boundary of the encoded information on the phonorecord to the outer edge of the disk. By applying a force to arm 15 in the direction indicated by the arrow in FIG. 1, the entire length of strip 13 is moved toward the disk surface to come into contact with the surface of the disk to be cleaned. Once the force is released, springs 23 and 29 return the strip to the position shown in FIG. 1, with the strip adjacent the surface of the disk to be cleaned. That is, in FIG. 1 the strip is near to but out of contact with the surface of the disk. It is preferred that the contact with the surface of the disk occur before play of the record is commenced so that playback characteristics of the phonorecord player are not affected. It has been found that contact between a suitably charged strip 13 and the record during at least one revolution of the record before playback is very effective in removing dust from the surface of the record. Thereafter, the strip suspended above the record surface continues to electrostatically clean the record surface while the disk is rotated with respect to the mounted strip, by the player, to effect relative movement between the disk and the strip throughout play of that side of the record.

Figure 2:
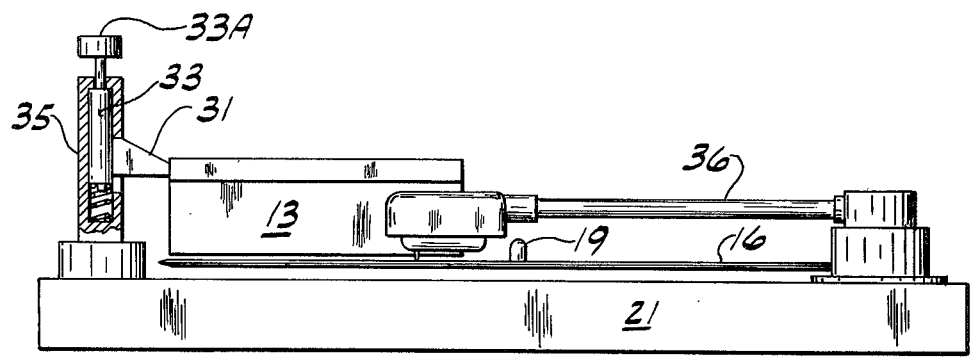
FIG. 2 is an elevation, with parts broken away, showing a second embodiment of a disk cleaning system of this invention.

In the embodiment of the present invention shown in FIG. 2, electrostatically activatable strip 13 is slidably secured in a C-channel shaped cantilever or beam 31 supported at its fixed end by a manually operable, upwardly biased spring-loaded plunger assembly 33 mounted in a hollow, cylindrical support post 35 and spans a portion of the surface of phonorecord 16. Assembly 33 includes a cap 33A constituting means responsive to a manually applied force for moving the entire strip from its biased position toward the surface of the disk to bring the strip into contact with the surface of the disk. Pressure applied to cap 33A causes strip 13 to contact the surface of the record while removal of the pressure causes the strip to return to its biased position shown in FIG. 2, out of contact with the surface of the phonorecord. Of course, as in the first embodiment, cleaning of the phonorecord occurs both during contact and thereafter as long as the strip remains suspended above the surface of the phonorecord being played. Tone arm 36 of phonorecord player 21 is shown in FIG. 2 to further illustrate one possible placement of the strip. As was the case with the embodiment of FIG. 1, suitable means for adjusting the spacing between the strip and the disk may also be provided.

Figure 3:
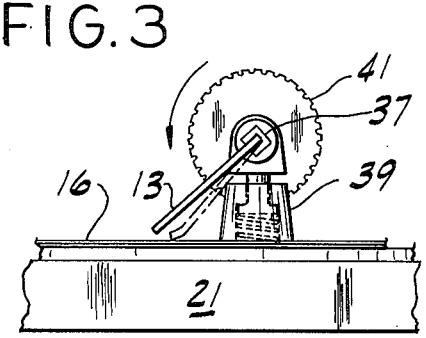
FIG. 3 is an elevation of an alternative mount for use in the second embodiment of the disk cleaning system of this invention.

The embodiment of the present invention shown in FIG. 3 includes a cantilever 37 in which strip 13 is releasably secured with its transverse axis at an angle of less than ninety degrees with respect to the surface of the disk to be cleaned. Cantilever 37 and strip 13 radially span at least a portion of the surface of record 16. Cantilever 37 is journaled in a spring-loaded support post 39 secured to player 21 and is rotatable about its longitudinal axis by means of a knurled knob 41. Counterclockwise rotation of knob 41 rotates strip 13 from the position shown in solid lines in FIG. 3, in which strip 13 is suspended above the surface of the record, to the position shown in phantom, in which strip 13 contacts the surface. Subsequent clockwise rotation of the knob returns the strip to its non-contacting position. Strip 13 may also be made to contact the surface of the disk by manually pressing on the top of spring-loaded post 39.

Figure 4:
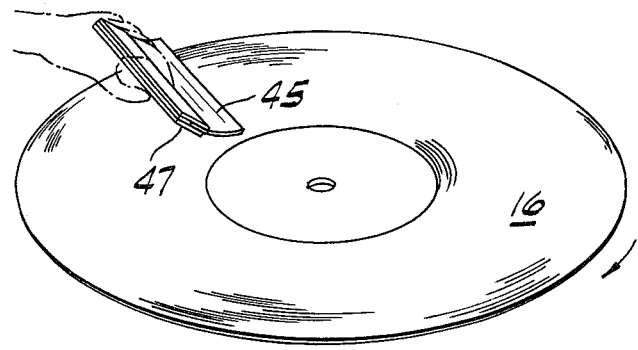
FIG. 4 is a perspective of a flexible, resilient, electrostatically activatable strip of this invention being manually used to clean the surface of a disk.

Although the embodiments of FIGS. 1-3 provide real-time protection and cleaning, the present invention need not be so used. For example, in FIG. 4 a flexible, resilient, electrostatically activatable strip 45 mounted in a holder 47 is shown being manually swept across the surface of record 16 to remove dust therefrom. It is preferred that this be done at a time other than when the disk is being played, i.e., either before or after the disk is played, or both.

Numerous materials have been tested for suitability as strips 13 and 45. Among these are a tacky-surfaced tan silicone rubber, a red silicone rubber, an opaque white silicone rubber, a semi-rigid fiberglass filled vinyl, polyethylene, polyvinylacetate, pelite, latex foam rubber, styrene, celluloid, polypropylene, polycarbonate, polyester film sold under the trade designation Mylar by DuPont, neoprene sponge, and hook-like pile surfaced material sold under the trademark "Velcro" and described in U.S. Pat. No. 2,717,437 issued Sept. 13, 1955.

Figure 5:
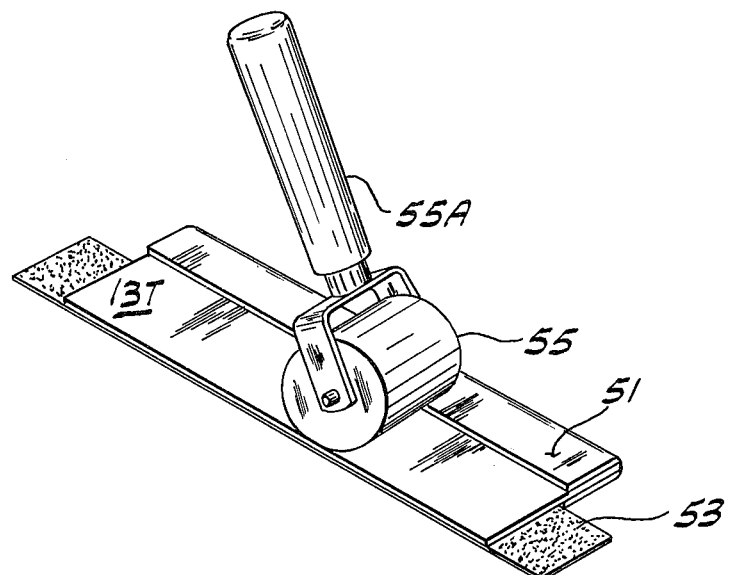
FIG. 5 is a perspective illustrating one method of charging and simultaneously cleaning the flexible, electrostatically activatable strip of this invention.
Figure 6:
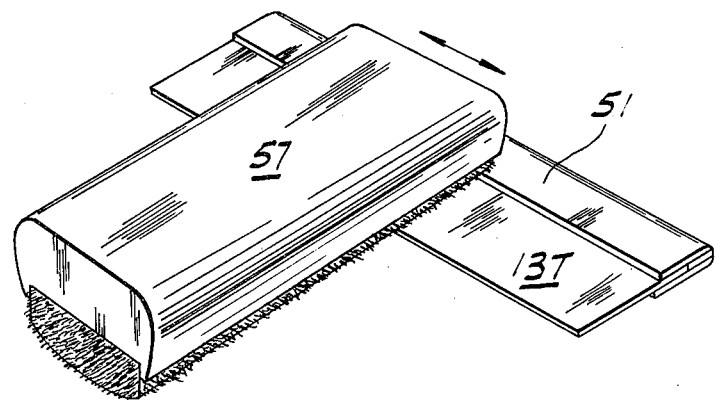
FIG. 6 is a perspective illustrating a second method of charging and simultaneously cleaning the flexible, electrostatically activatable strip of this invention.

In testing these materials, strips generally four inches (10 cm) in length and one inch (2.5 cm) in height were mechanically charged using charging methods illustrated in FIGS. 5 and 6. In the method illustrated in FIG. 5, a strip 13T to be tested is mounted in an optional insulative holder 51 (or holder 47) and placed face down on a piece of adhesive tape 53 having a pressure sensitive adhesive layer on the upper surface thereof. A wooden roller 55 to which is secured a handle 55A is rolled longitudinally along strip 13T several (e.g., 10) times to apply pressure to the strip. Strip 13T is then removed or separated from the adhesive coated surface of tape 53 to simultaneously clean and charge the strip, the resulting electrostatic voltage being substantially uniform along the strip's longitudinal axis.

In the charging method illustrated in FIG. 6, a brush 57, such as the brush disclosed in the aforementioned U.S. Pat. No. 3,965,520 to Maier, is used to brush the upper face of strip 13T for a number of strokes (e.g., 10 or 20 strokes) sufficient to charge the strip substantially uniformly along its longitudinal axis, thereby simultaneously cleaning and charging the strip. No adhesive tape is used or needed to charge the strip when the method of FIG. 6 is used. If strips accept and retain a voltage as a result of the charging methods of FIG. 5 or 6, they are considered mechanically chargeable and electrostatically activatable.

Of the materials tested for strip 13, the best results were achieved with elastomers, and specifically with a tacky-surfaced tan silicone rubber sold under the trade designation COHRlastic A9430 by the Connecticut Hard Rubber Company of New Haven, Conn. A strip of this material 1/32" (0.1 cm) thick has a Shore A durometer hardness of 30 and a surface tack of at least 20 gm as measured by an instrument sold under the trade designation Polyken Probe Tack Tester—Model No. 480-2 by Testing Machines, Inc. of Amityville, N.Y. This material is air cured but could also be temperature cured and still retain its tacky quality. Completely satisfactory results were also achieved with other silicone rubbers including a red silicone rubber of the same thickness, sold under the trade designation COHRlastic 500 by the Connecticut Hard Rubber Company. A white opaque silicone rubber sold by the Connecticut Hard Rubber Company under the trade designation COHRlastic 9255 also achieves satisfactory results. Both these latter materials have a Shore A durometer hardness of 50 and neither has a tacky surface.

A latex rubber with a tensile strength of 3,000 pounds, a Shore A durometer hardness of 35-45 and an elongation of 500-600% was also found to be satisfactory as a material for strip 13.

The electrostatic voltages generated on test strips 13T were measured by an electrostatic field scanner sold under the trade designation Microstat by Scientific Enterprises, Inc. of Broomfield, Colo. and were verified using an electrostatic voltmeter sold under the trade designation Model 244 Isoprobe by Monroe Electronics, Inc. of Lyndonville, N.Y.

The voltages generated on the tacky tan silicone rubber strip and the red silicone rubber strip were generally the same. Each could be charged to an average of between $-6500$ and $-8000$ volts using ten to twenty brush strokes or the roller/tape method of charging. It is preferred, however, that the brush charging method not be used with the tacky tan silicone rubber because that tends to reduce the surface tack of the material. This surface tack is a desirable feature in that it supplements the electrostatic attraction of the charged strip in collecting dust off the surface of disks such as phonorecords. Roller/tape charging of the red silicone rubber can, in some instances, give somewhat inconsistent charging levels. No such effect was observed with roller/tape charging of the tacky tan silicone rubber. During the tests on these silicone rubbers, it was found that the average voltage retained on the strips five minutes after charging was $-5000$ volts and after twenty-five minutes was $-3200$ volts. The twenty-five minute period was chosen as the time it typically takes to play one side of a phonorecord.

The tests on the opaque white silicone rubber material revealed a somewhat lower initial electrostatic field than with the previous two materials and a somewhat faster fall off of field with time. With the opaque white silicone rubber, the average initial field ranged from $-5000$ volts for roller/tape charging to slightly over $-6000$ volts for twenty strokes of brush charging. Five minutes after charging the average voltage fell to $-3500$ volts and after twenty-five minutes the average electrostatic voltage was $-1000$ volts. This level is above the $-900$ volt level which applicant has determined to be the approximate lower level for effectively attracting dust from the surface of phonorecords. In general, cleaning of these materials was more efficient by the roller/tape method than by the brush method.

The results for the latex rubber material fell within those for the opaque white silicone rubber on the one hand and the red and tacky tan silicone rubbers on the other. The average initial electrostatic voltage with the latex rubber was −6000 volts. Five minutes after charging, the voltage on the test strip fell to −3500 volts and after twenty-five minutes it fell on the average to −1100 volts.

The other materials tested for use as strip 13 were less satisfactory for electrostatically cleaning disks than the materials just discussed. For example, a 0.005 in (0.01 cm) thick strip of the clear polyester film sold under the trade designation Mylar by DuPont would not accept a negative electrostatic voltage while an orange-tinted strip of the same material which was only 0.0025 in (0.005 cm) thick did accept an electrostatic voltage of about −3000 volts. Both strips were too flimsy to serve as strip 13. For purposes of ensuring good contact with the disk during the preliminary cleaning phase (i.e., when the strip is actually in physical contact with the disk) and for maintaining the strip during the real-time cleaning phase in the attitude shown in FIG. 3, a material more mechanically self-sustaining than these polyester films is required. Similarly, the Velcro material was unsatisfactory because, although it accepted an initial electrostatic voltage of −1600 volts, the voltage rapidly (within five minutes) fell below −900 volts, which severely limits the use of this material for real-time cleaning of disks. Moreover, the surface of the Velcro material, being uneven, does not come into contact evenly with the surface of the disk during the preliminary cleaning phase. The latex foam material suffered from the same deficiencies as the Velcro material and had almost exactly the same electrostatic characteristics, as did the pelite material.

The neoprene sponge material only accepted an initial voltage of −1500 volts and this rapidly decreased (within ten minutes) to −1000 volts. Moreover, this material, because of its sponge construction also does not come into contact evenly with the surface of a disk being cleaned. The fiberglass-filled vinyl accepted a higher initial voltage (−2000 volts) but the voltage fell below −1000 volts in one minute. This material was also unacceptable because it is so hard it tends to mar the surface of phonorecords. Phonorecords are believed to have a Shore A hardness of about 100 and any material with a comparable hardness will tend to mar the phonorecords surface when used in this invention.

The polyethylene and polypropylene strips tested achieved electrostatic voltages comparable to those of the silicone rubbers tested but these materials are not as desirable for use in this invention as the silicone rubbers because of their hardness. Like the fiberglass-filled vinyl they tend to mar the surface of records. Polyvinylacetate strips also tend to mar the surface of phonorecords. Moreover the electrostatic voltage on this material tends to fall off somewhat more quickly than with the polyethylene and polypropylene strips.

As a result of these tests, it is preferred that the silicone or latex rubbers mentioned be used as the material for strip 13.

From the above it should be realized that the method of this invention includes mechanically charging, as shown in FIGS. 5 and 6 for example, electrostatically activatable elongate strip 13 of a soft flexible material such as silicone rubber or latex rubber to a voltage sufficient to remove dust particles from the surface of a disk to be cleaned, said voltage being substantially uniform along the longitudinal axis of the strip, the strip being capable of retaining a voltage of said level at least long enough to permit passing it over one entire side of the disk before recharging. The strip is then moved from the place where it was charged, called a charging area, to the surface of the disk to be cleaned and is passed over at least a portion of the disk's surface to remove dust particles therefrom.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of cleaning disks containing encoded information, such as phonorecords and videodiscs, comprising:
   mechanically charging in a charging area to a voltage sufficient to remove dust particles from the surface of a disk to be cleaned, an electrostatically activatable elongate body of soft flexible material by pressing it against a surface coated with a pressure sensitive adhesive, and then separating the body from said adhesive coated surface thereby simultaneously cleaning and charging said body, said voltage being substantially uniform along the longitudinal axis of the body, the body being capable of retaining a voltage of said level at least long enough to permit passing said body over one entire side of the disk before recharging;
   moving said body from the charging area to the surface of the disk to be cleaned; and
   passing the body over at least a portion of the surface of the disk to be cleaned to remove dust particles therefrom.

2. The method as set forth in claim 1 wherein the step of passing the charged body over the disk is done manually and at a time other than when the disk is being played.

3. The method as set forth in claim 1 wherein the body is a strip capable of retaining a charge of said voltage level for a period of time at least as long as that required to play an entire side of the disk.

4. The method as set forth in claim 3 wherein the step of passing the strip over the disk includes the steps of mounting said strip to span at least a portion of one side of the disk and rotating the disk with respect to the mounted strip to effect relative movement between the disk and the strip.

5. The method as set forth in claim 4 wherein in the mounting step the strip is mounted substantially radially with respect to the disk and extends generally from the inner boundary of the encoded information to the outer edge of the disk.

6. The method as set forth in claim 5 wherein throughout play of a side of the disk the lower edge of the mounted strip is closely adjacent to but out of contact with the surface of the disk thereby to maintain a clean disk surface during playing of the disk.

7. The method as set forth in claim 6 wherein in the mounting step the strip is disposed with its transverse axis at an angle of less than ninety degrees with respect to the surface of the disk to be cleaned.

8. The method as set forth in claim 6 further including a preliminary step of bringing the mounted strip into contact with the surface of the disk for at least one revolution of the disk before play of the disk is begun.

9. The method as set forth in claim 8 wherein in the step of bringing the strip into contact with the surface of the disk the entire strip is moved toward the surface of the disk.

10. The method as set forth in claim 8 wherein the mounted strip is brought into contact with the surface of the disk by rotating said strip about its longitudinal axis.

11. The method as set forth in claim 1 wherein said material is capable of accepting and retaining a voltage of at least a negative nine hundred volts for at least approximately twenty-five minutes.

12. The method as set forth in claim 11 wherein the material has a Shore A durometer hardness of less than approximately 100.

13. The method as set forth in claim 12 wherein said material has a Shore A durometer hardness of no greater than approximately 50.

14. The method as set forth in claim 13 wherein said material has a Shore A durometer hardness of approximately 30.

15. The method as set forth in claim 13 wherein the material is an elastomer.

16. The method as set forth in claim 15 wherein the elastomer is a silicone rubber having a Shore A durometer hardness of approximately 50.

17. The method as set forth in claim 16 wherein the body is a strip with a thickness in the range of from approximately 0.1 centimeters to approximately 0.3 centimeters.

18. The method as set forth in claim 15 wherein the elastomer is an open-air cured silicone polymer having a Shore A durometer hardness of approximately 30.

19. The method as set forth in claim 15 wherein the elastomer is a latex rubber.

20. Apparatus for cleaning disks containing encoded information, such as phonorecords and videodiscs, comprising:
an electrostatically activatable elongate strip of mechanically chargeable, soft flexible material capable of retaining an electrostatic voltage sufficient to remove dust particles from the surface of a disk to be cleaned for at least as long as the time required to play one entire side of the disk before recharging, said electrostatic voltage being substantially uniform along the longitudinal axis of the strip; and
means for mounting said strip to span at least a portion of one side of said disk while the disk is rotated with respect thereto by a player to effect relative movement between the disk and the strip, without influencing the rotational characteristics of the disk and playback characteristics of the player, whereby dust particles on the disk in the vicinity of the strip as the disk is rotated with respect thereto are attracted to and captured by the strip as a result of the electrostatic voltage on the strip;
said mounting means including means for securing the strip adjacent the surface of said disk and substantially along a radius of said disk, said strip in use extending generally from the inner boundary of the encoded information to the outer edge of the disk with the lower edge of the strip being closely adjacent to but spaced from the surface of the disk,
said mounting means further including means for selectively bringing the lower edge of the strip into contact with the surface of the disk.

21. Apparatus as set forth in claim 20 wherein the strip is mounted with its transverse axis at an angle of less than ninety degrees with respect to the surface of the disk to be cleaned and wherein the means for bringing the lower edge of the strip into contact with the surface of the disk includes means for rotating the strip about its longitudinal axis to bring the lower margin of the strip into contact with the surface of the disk for at least one revolution of the disk before play of the disk is begun.

22. Apparatus as set forth in claim 21 wherein the mounting means includes means for biasing the strip to its position adjacent to but out of contact with the surface of said disk and further includes means responsive to a manually applied force for moving the entire strip away from its biased position and toward the surface of the disk to bring the lower margin of the strip into contact with said surface for at least one revolution of the disk before play of the disk is begun.

* * * * *